United States Patent
Nomura et al.

[19]

[11] Patent Number: 5,976,425
[45] Date of Patent: Nov. 2, 1999

[54] OPTICAL DEVICE MOLDING APPARATUS AND METHOD, AND OPTICAL DEVICE

[75] Inventors: Takeshi Nomura; Kiyoshi Yamamoto, both of Yokohama; Masashi Mashige, Kawasaki, all of Japan

[73] Assignee: Canon Kabushiki Kaisha, Tokyo, Japan

[21] Appl. No.: 08/993,155

[22] Filed: Dec. 18, 1997

[30] Foreign Application Priority Data

Dec. 26, 1996 [JP] Japan ..................... 8-348056

[51] Int. Cl.⁶ ............................................. B29D 11/00
[52] U.S. Cl. ..................... 264/2.2; 65/29.1; 65/102; 264/1.1
[58] Field of Search ........................ 264/2.2, 1.1, 1.21; 65/29.12, 29.14, 29.18, 29.1, 29.11, 29.19, 66, 102, 64

[56] References Cited

U.S. PATENT DOCUMENTS

| | | | |
|---|---|---|---|
| 3,761,208 | 9/1973 | Boudet et al. | 425/352 |
| 5,160,362 | 11/1992 | Yamamoto et al. | 65/102 |
| 5,178,801 | 1/1993 | Shimizu et al. | 264/2.2 |
| 5,215,566 | 6/1993 | Yamamoto et al. | 65/29 |
| 5,228,894 | 7/1993 | Sato et al. | 65/102 |
| 5,435,818 | 7/1995 | Mashige et al. | 65/29.12 |
| 5,604,549 | 2/1997 | Mashige et al. | 351/177 |

FOREIGN PATENT DOCUMENTS

| | | |
|---|---|---|
| 4-21610 | 4/1992 | Japan. |
| 5-43261 | 2/1993 | Japan. |
| 5-306131 | 11/1993 | Japan. |

*Primary Examiner*—Sean Vincent
*Attorney, Agent, or Firm*—Fitzpatrick, Cella, Harper & Scinto

[57] ABSTRACT

Lens surfaces are transferred by press-molding a glass material (16) by an upper mold (1) and a lower mold (2). After the lens surfaces are transferred, the outer circumferential portions of the upper and lower molds (1, 2) are clamped and pressed sideways to correct a shift between the optical axes of the transfer molding surfaces of the upper and lower molds (1, 2) and an inclination of the optical axes.

6 Claims, 10 Drawing Sheets

OPTICAL DEVICE MOLDING APPARATUS AND METHOD, AND OPTICAL DEVICE

BACKGROUND OF THE INVENTION

1. Field of the Invention

The present invention relates to a molding apparatus and method of obtaining a glass molded product by press-molding a glass material heated to be deformable.

2. Description of the Related Art

As a conventional glass molding method of obtaining an optical device by pressing a glass material, a general approach is to perform molding by using a set of molds including a pair of upper and lower molds and a mold frame for slidably holding these upper and lower molds. In molding a lens by using this method, it is necessary to prevent a difference between the optical axes of one optical function surface and the other optical function surface and an inclination of the optical axes. To this end, it is necessary not only to accurately finish the mold frame, the upper mold, and the lower mold but also to increase the accuracy with which the mold frame and these molds are assembled.

Since, however, demands on an improvement of the accuracy of press molding of a lens and on reduction in the manufacturing cost are continually increasing, the conventional method cannot satisfy some of these demands. One is the problem of the difference between the optical axes of the two surfaces of a lens or an inclination of the optical axes.

In the above conventional method, for example, the upper and lower molds are slidably incorporated into a hole formed in the mold frame (guide member) for guiding the molds for transferring optical surfaces to a glass material. To increase the optical axis accuracy of a lens, it is necessary to increase the fitting accuracy between the upper and lower molds and the mold frame. However, the improvement of the optical axis accuracy is limited by the processing accuracy of each mold and the high-temperature slidability during pressing.

The upper and lower molds for transferring the optical function surfaces to a glass material are slidably supported by the guide member, and the glass material is inserted between the upper and lower molds and press-molded. If the optical axes of the upper and lower molds, which are originally aligned with each other, produce a parallel shift in the guide member, parallel decentering is produced in the molded lens.

Also, if the upper or lower mold inclines in the fitting gap in the guide member, the optical axes of two optical function surfaces incline.

In Japanese Patent Publication No. 4-21610, the positional relationship between the lower mold and a slide core is maintained because these two members are in contact with each other. However, the upper mold requires a gap so as to be movable in the slide core. Consequently, it is difficult to precisely match the optical axes of the upper and lower molds.

It is, therefore, the first object of the present invention to provide an optical device molding apparatus and method capable of obtaining a glass molded product with high optical axis accuracy.

It is the second object of the present invention to provide an optical device molding apparatus and method capable of more effectively achieving the first object of the present invention with a simpler mold structure.

It is the third object of the present invention to provide an optical device molding apparatus and method capable of obtaining a glass molded product with not only high optical axis accuracy between the two surfaces of an optical device but also high accuracy in the positional relationship between the circumferential surface and the optical axes.

It is the fourth object of the present invention to provide an optical device molding apparatus and method capable of smoothly extracting a molded product without complicating the mold structure.

It is the fifth object of the present invention to provide an optical device molding apparatus and method capable of processing an optical device with any arbitrary shape.

It is the sixth object of the present invention to provide an optical device molding apparatus and method capable of regulating a shift between the optical axes of aspherical optical function surfaces and an inclination of the optical axes.

SUMMARY OF THE INVENTION

To solve the above problems and achieve the above objects, an optical device molding apparatus according to the present invention is an apparatus for molding an optical device having a plurality of optical surfaces, comprising a pair of molds having transfer surfaces for transferring the optical surfaces of the optical device, a guide member for slidably guiding the pair of molds in a first direction, control means for controlling the movement of the pair of molds in the first direction, and adjusting means for adjusting optical axes of the optical surfaces after the optical surfaces are transferred.

An optical device molding method according to the present invention is a method of molding an optical device having a plurality of optical surfaces, comprising the steps of inserting a material of the optical device into a pair of molds having transfer surfaces for transferring the optical surfaces of the optical device, holding the pair of molds and the material of the optical device at a temperature at which press deformation is possible, and pressing the material of the optical device by the pair of molds to transfer the optical surfaces to the material, and pressing outer circumferential portions of the pair of molds in a direction perpendicular to optical axes of the optical surfaces to adjust the optical axes of the optical surfaces.

An optical device according to the present invention is molded through the steps of transferring optical surfaces by press-molding a material of the optical device so heated as to be deformable by using a pair of molds having transfer surfaces for transferring the optical surfaces, and adjusting optical axes of the optical surfaces.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the accompanying drawings.

[First Embodiment]

Figure 1:
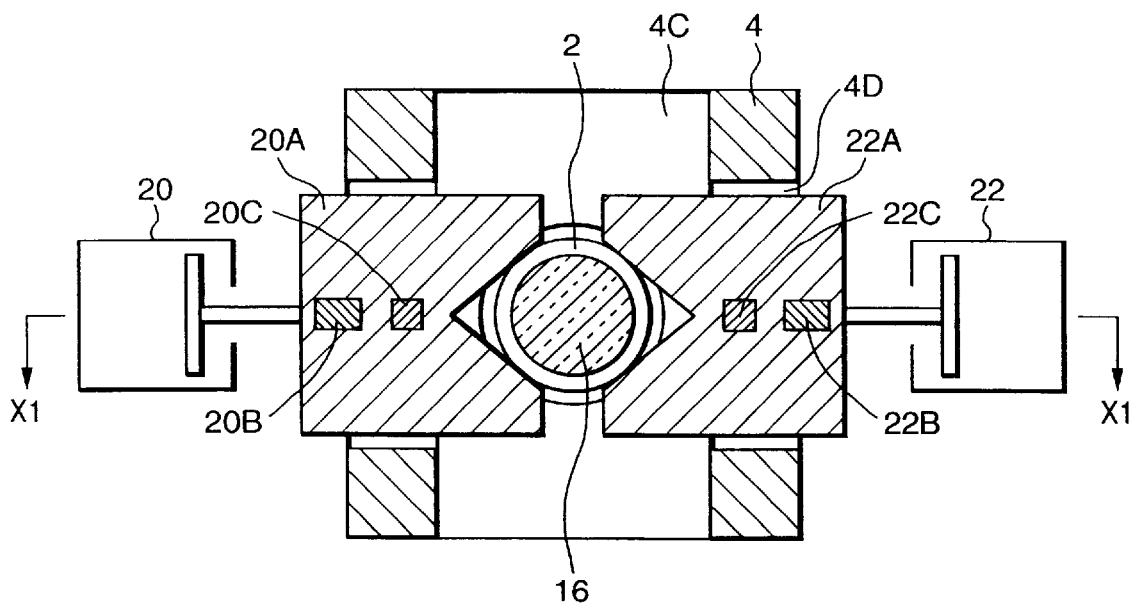
FIG. 1 is a sectional view taken along a line X2—X2 in FIG. 2 showing the main part of an optical device molding apparatus of the first embodiment according to the present invention, which shows molds and their vicinity when a press operation is almost complete.
Figure 2:
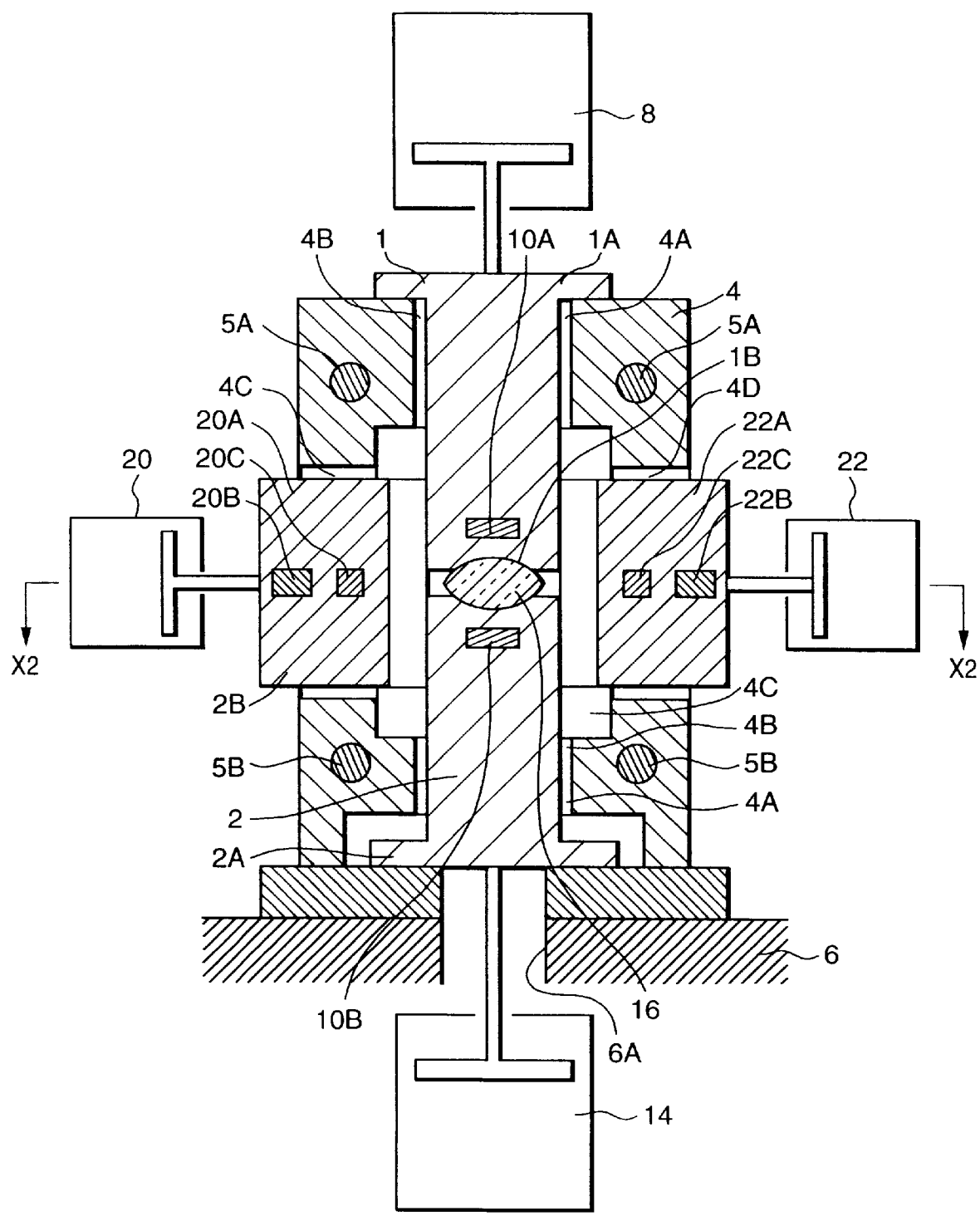
FIG. 2 is a sectional view taken along a line X1—X1 in FIG. 1 showing the main part of the optical device molding apparatus of the first embodiment according to the present invention, which shows the molds and their vicinity when the press operation is almost complete.
Figure 3:
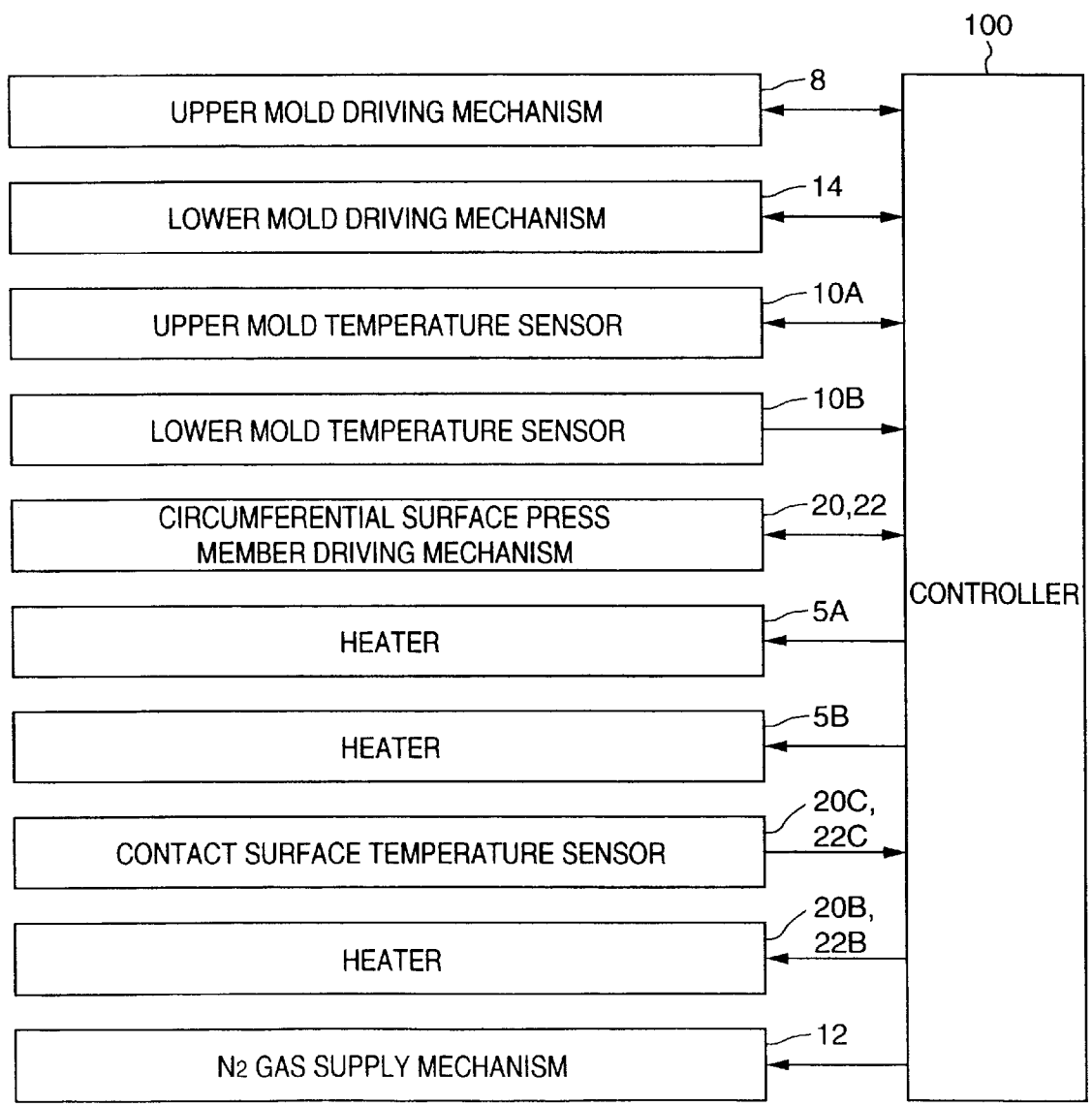
FIG. 3 is a control block diagram of the optical device molding apparatus shown in FIGS. 1 and 2.

As shown in FIGS. 1 to 3, a guide member 4 is placed on a support base plate 6 to constitute outer shells of upper and lower molds 1 and 2. The guide member 4 guides the upper and lower molds 1 and 2 by vertically sliding them while holding their positional relationship. The guide member 4 is a substantially prism having a square section when viewed from above, and a through hole 4A is formed along the central axis of the guide member 4 so as to vertically extend through the guide member 4. The upper mold 1 having a circular cylindrical shape is fitted in the upper portion of the through hole 4A so as to be vertically slidable with respect to the guide member 4. A slight gap 4B is formed between the upper mold 1 and the guide member 4. A disk-like flange 1A is formed on the upper end portion of the upper mold 1. The lower surface of the flange 1A abuts against the upper surface of the guide member 4 from above to regulate the downward movement of the upper mold 1, defining the downward stroke of the upper mold 1. Also, a transfer molding surface 1B is formed in a central portion of the lower surface of the upper mold 1 with high accuracy with respect to the outer diameter of the upper mold 1. This transfer molding surface 1B presses a glass material 16 to transfer a desired shape onto the surface of the glass material 16, thereby forming an optical function surface.

An upper mold driving mechanism 8 for generating a pressure to the glass material 16 is provided above the upper mold 1. This upper mold driving mechanism 8 includes a hydraulic cylinder and a piston and is pressed down under the control of a controller 100. Consequently, the upper mold 1 moves down to apply the pressure to the glass material. The upper mold 1 also includes an upper mold temperature sensor 10A for measuring the temperature near the transfer molding surface. The upper mold 1 further includes a cooling pipe for cooing the upper mold 1 through an $N_2$ eject pipe (not shown) from an $N_2$ gas supply mechanism 12 (not shown). A detection signal from the upper mold temperature sensor 10A is output to the controller 100. In accordance with this detection signal, the controller 100 controls the $N_2$ gas supply mechanism 12.

On the other hand, the lower mold 2 having the same circular cylindrical shape as the upper mold 1 is fitted in the through hole 4A of the lower portion of the guide member 4 so as to be vertically slidable with respect to the guide member 4. A slight gap 4B also exists between the lower mold 2 and the guide member 4. A disk-like flange 2A is formed on the lower end portion of the lower mold 2. The lower surface of the flange 2A abuts against the upper surface of the support base plate 6 on which the guide member 4 is placed. This support base plate 6 receives the pressure applied downward from the upper mold 1 to the lower mold 2 via the glass material. A transfer molding surface 2B for forming an optical function surface by transferring a desired shape onto the lower surface of the glass material is formed in the central portion of the upper surface of the lower mold 2 with high accuracy with respect to the outer diameter of the lower mold 2.

Accordingly, the optical function surfaces are transferred to the glass material 16 by the transfer molding surfaces 1B and 2B of the upper and lower molds 1 and 2, respectively.

Also, the thickness of a molded product is defined by the contact of the lower surface of the flange 1A of the upper mold 1 with the upper surface of the guide member 4. This prevents the thickness of a molded product from varying during molding.

Additionally, a lower mold driving mechanism 14 including a hydraulic cylinder and a piston is provided below the lower surface of the lower mold 2 and connected to the lower surface of the lower mold 2 through a through hole 6A formed in the support base plate 6. In a cooling process after a press operation for the molded product 16 is complete, the lower mold driving mechanism 14 presses the lower mold 2 upward to apply a pressure to the molded product 16 under the control of the controller 100, in order to retain the surface shapes of the molded product 16.

The lower mold 2 also includes a lower mold temperature sensor 10B for measuring the temperature near the transfer molding surface. Furthermore, similar to the upper mold 1, the lower mold 2 includes a cooling pipe for cooling the lower mold 2 through an $N_2$ eject pipe (not shown) from the $N_2$ gas supply mechanism 12 (not shown). A detection signal from the lower mold temperature sensor 10B is output to the controller 100. In accordance with this detection signal, the controller 100 controls the $N_2$ gas supply mechanism 12.

A hole 4C is formed in the side surfaces of the guide member 4. A glass material is supplied into the upper molds 1 and 2 through this hole 4C. When molding is complete, the molded product 16 is extracted from inside the upper and lower molds 1 and 2 through the hole 4C.

Additionally, a through hole 4D is formed in the side surfaces of the guide member 4 in a direction perpendicular to the hole 4C. Circumferential surface press members 20A and 22A are fitted in this through hole 4D so as to clamp the upper and lower molds 1 and 2 between them. After the press operation, the circumferential surface press members 20A and 22A press the circumferential surfaces of the upper and lower molds 1 and 2 toward the central axis to correct a shift between the optical axes. A gap between the through hole 4D in the guide member 4 and the circumferential surface press members 20A and 22A is so set as to be larger than the gap 4B between the guide member 4 and the upper mold 1 or the lower mold 2.

As shown in FIG. 1, portions of the circumferential surface press members 20A and 22A, which abut against the upper and lower molds 1 and 2, are formed to have a V-shape with an angle of substantially 90°, so that these portions linearly abut against the outer circumferences of the upper and lower molds 1 and 2. Furthermore, the outer circumferences of the upper and lower molds 1 and 2 are accurately finished to have the same dimensions. Therefore, the circumferential surface press members 20A and 22A can keep contacting both the upper and lower molds 1 and 2.

Circumferential surface press member driving mechanisms 20 and 22 each including a hydraulic cylinder and a piston are provided on the sides of the circumferential surface press members 20A and 22A away from the sides on which these members abut against the upper and lower molds 1 and 2. These circumferential surface press member driving mechanisms 20 and 22 operate in substantially synchronism with each other under the control of the controller 100 and can move the circumferential surface press members 20A and 22A forward or backward along the central axis of the upper and lower molds.

The circumferential surface press members 20A and 22A incorporate heaters 20B and 22B and contact surface temperature sensors 20C and 22C for measuring the temperatures near the contact surfaces, respectively. Accordingly, the circumferential surface press members 20A and 22A can be adjusted to an arbitrary temperature. The temperatures of the heaters 20B and 22B are controlled by the controller 100, and detection signals from the contact surface temperature sensors 20C and 22C are output to the controller 100.

The guide member 4 incorporates heaters 5A and 5B for heating the guide member 4 and the upper and lower molds 1 and 2 and also heating a glass material via the guide member 4 and the upper and lower molds 1 and 2.

These heaters 5A and 5B are connected to separate temperature control units (not shown) provided for the upper and lower molds 1 and 2. The controller 100 controls the temperatures of the heaters 5A and 5B in accordance with the temperatures sensed by the upper mold temperature sensor 10A of the upper mold 1 and the lower mold temperature sensor 10B of the lower mold 2.

As described above, the controller 100 totally controls the operations of the individual mechanisms and heaters of the optical device molding apparatus of this embodiment.

[Lens Molding Procedure]

A procedure of obtaining a glass molded product such as a lens by using the above optical device molding apparatus will be described below.

With reference to FIGS. 1 and 2, the piston of the upper mold driving mechanism 8 is retracted to slide the upper mold 1 upward with respect to the guide member 4, thereby retracting the upper mold 1 from the lower mold 2. Also, the circumferential surface press member driving mechanisms 20 and 22 are made to perform a retracting operation to retract the circumferential surface press members 20A and 22A sideways from the upper and lower molds 1 and 2.

After the upper and lower molds 1 and 2 and the circumferential surface press members 20A and 22A are thus retracted, a glass material heated to a predetermined temperature is supplied onto the transfer molding surface of the lower mold 2 through the hole 4C in the guide member 4 by, e.g., an automatic hand. The guide member 4 and the upper and lower molds 1 and 2 are heated to a temperature meeting predetermined molding conditions. The circumferential surface press members 20A and 22A are also adjusted to a predetermined temperature.

After the glass material is supplied onto the transfer molding surface of the lower mold 2, the upper mold driving mechanism 8 is made to perform an extending operation to press the transfer molding surface of the upper mold 1 against the upper surface of the glass material, thereby pressing the glass material.

When the upper mold 1 gradually moves down to apply the pressure to the glass material, the glass material is gradually pressed in the horizontal direction. Finally, the glass material is completely pressed and deformed when the flange 1A of the upper mold 1 abuts against the upper surface of the guide member 4.

After the pressing force applied to the upper mold 1 by the upper mold driving mechanism 8 is released to be substantially zero, the circumferential surface press member driving mechanisms 20 and 22 are made to perform an extending operation to press the circumferential surface press members 20A and 22A against the outer circumferential surfaces of the upper and lower molds 1 and 2. The upper and lower molds 1 and 2 are kept pressed for a while and started to be cooled. By this pressing by the circumferential surface press members 20A and 22A, it is possible to correct a positional shift between the central axes of the upper and lower molds 1 and 2 produced in the gap 4B between the guide member 4 and the upper and lower molds 1 and 2 and thereby align the optical axes of the transfer molding surfaces (optical function surfaces) of the upper and lower molds 1 and 2.

Note that FIGS. 1 and 2 show the state in which the positional difference is corrected by pressing the circumferential surface press members 20A and 22A against the upper and lower molds 1 and 2. In this state, the molded product 16 has a desired thickness. Also, the cooling of the upper and lower molds 1 and 2 is promoted by $N_2$ gas supplied from the $N_2$ gas supply mechanism 12 to the cooling pipe through the $N_2$ eject pipe (none of them is shown).

After the upper and lower molds 1 and 2 and the circumferential surface press members 20A and 22A are kept cooled for a few seconds, the circumferential surface press member driving mechanisms 20 and 22 are made to perform a retracting operation to return the circumferential surface press members 20A and 22A to their original retraction positions. The upper mold driving mechanism 8 is again made to perform an extending operation to apply a pressure to the upper mold 1. To retain the surface shapes of the molded product 16, the lower mold driving mechanism 14 is made to perform an extending operation to press the lower mold 2 downward, thereby applying a pressure to the molded product 16. When the temperature lowers to a predetermined temperature, the lower mold driving mechanism 14 is made to perform a retracting operation to release the pressure from the molded product 16.

Thereafter, the upper mold driving mechanism 8 is again made to perform a retracting operation to move the upper mold 1 upward. The resultant molded product 16 is extracted to the outside through the hole 4C in the guide member 4 by, e.g., an automatic hand.

In the series of operations described above, when the press deformation for molding a lens is complete, the outer circumferential portions of the upper and lower molds are clamped and pressed to correct the optical axes of these molds. Consequently, a molded product with extremely high decentering accuracy can be obtained.

<First Molding Conditions>

A first practical example of glass lens molding conditions under which molding was performed by using the optical device molding apparatus shown in FIGS. 1 and 2 will be described below.

Heavy crown glass (refractive index=1.58, Abbe number= 59.4, and glass transition temperature=506° C.) was used as a glass material to mold an aspherical convex lens having a convex lower surface with a radius R of 9 mm and an aspherical convex upper surface (approximate radius R=9 mm). This aspherical convex lens had a diameter of 7 mm, a central thickness of 3.0 mm, and a circumferential thickness of 1.6 mm.

The glass material was charged into the upper and lower molds when the temperature of these molds was 470° C. ($10^{15.2}$ P(Poise)=dyn·s/cm$^2$). When the temperature of the upper and lower molds rose to 580° C. ($10^{9.0}$ P) and the temperature of the glass material reached the temperature of the molds, the glass material was pressed and deformed by the upper mold to transfer the transfer molding surfaces of the molds, thereby forming optical function surfaces and determining the thickness of the lens.

While the mold temperature was maintained, the outer circumferential portions of the upper and lower molds were clamped and pressed by the circumferential surface press members.

At this time, both the press load to the upper mold and the press load to the circumferential surface press members were 1,900 N, and the time of pressing from the circumferential surfaces was set to 10 sec.

Thereafter, the glass material was cooled until the temperature lowered to 490° C. ($10^{13.5}$ P) while a press load of 1,500 N was applied from the lower mold so as to retain the shapes of the optical function surfaces of the glass material, and the resultant molded product was extracted.

The glass lens molded under the above molding conditions had parallel decentering of 5 μm or less and an optical axis inclination of 50 sec or less. Accordingly, this glass lens was extremely superior as, e.g., a lens of a video camera.

<Second Molding Conditions>

A second practical example of glass lens molding conditions under which molding was performed by using the optical device molding apparatus shown in FIGS. 1 and 2 will be described below.

Lanthanum crown glass (refractive index=1.67, Abbe number=55.4, and glass transition temperature=530° C.) was used to mold a concave lens, both surfaces of which were concave spherical surfaces (approximate radius R=30 mm), having an outer diameter of 15 mm and a central thickness of 1.5 mm under the following conditions.

The glass material was supplied when the temperature of the upper and lower molds was 485° C. ($10^{14.0}$ P). When the temperature of the upper and lower molds rose to 590° C. ($10^{9.0}$ P) and the glass material reached substantially the same temperature as the molds, a press load of 2,900 N was applied for 30 sec by the upper mold to transfer the transfer molding surfaces as optical function surfaces. Thereafter, cooling was started at the same time a press load of 2,900 N was started to be applied to the circumferential surface press members to correct the optical axes. The press load to the circumferential surface press members was once released when the mold temperature lowered to 575° C. ($10^{9.8}$ P), and immediately a load of about 2,000 N with which the optical function surfaces retained their shapes was applied from the lower mold. The load from the lower mold was once released when the mold temperature lowered to 555° C. ($10^{10.6}$ P), and a press load of 2,900 N was again applied for 10 sec by the circumferential surface press members to correct the optical axes. Thereafter, the press load from the circumferential surfaces was released, and pressing from the lower mold was again executed until the mold temperature lowered to 485° C. ($10^{14.9}$ P). In this manner, the molding operation was complete.

The glass lens molded under the above molding conditions had a parallel decentering of 2 μm or less and an optical axis inclination of 20 sec or less.

[Second Embodiment]

The arrangement of the second embodiment is substantially the same as that of the optical device molding apparatus of the first embodiment except that the guide member 4 is not used. Therefore, a detailed description of the same parts will be omitted.

Figure 4:
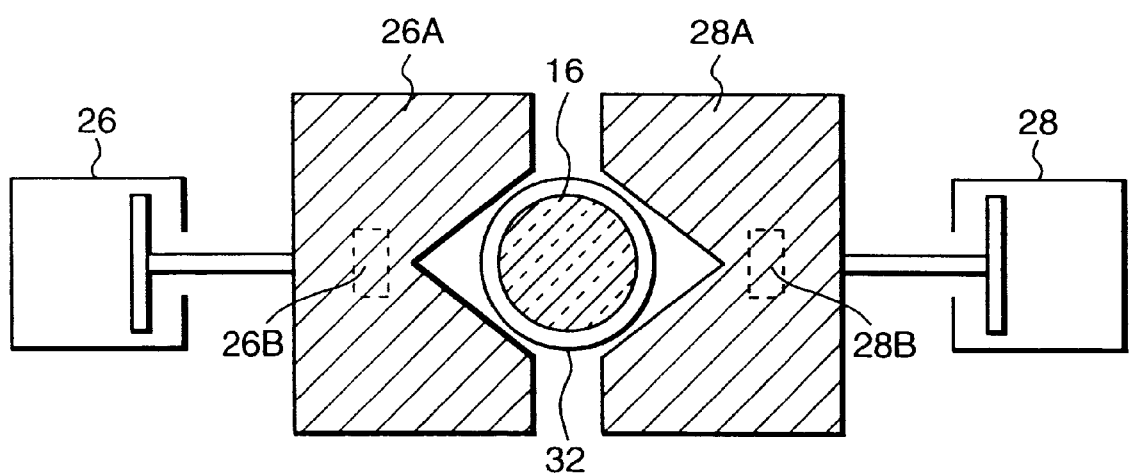
FIG. 4 is a sectional view taken along a line Y2—Y2 in FIG. 6 showing the main part of a molding apparatus of the second embodiment according to the present invention, which shows the state before and during pressing.
Figure 5:
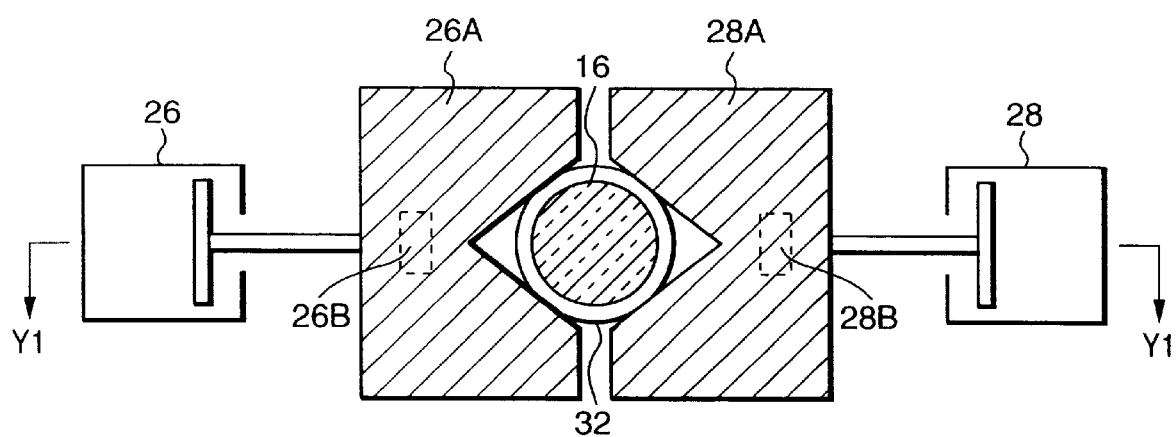
FIG. 5 is a sectional view taken along the line Y2—Y2 in FIG. 6 showing the main part of the molding apparatus of the second embodiment according to the present invention, which shows the state when the press operation is almost complete.
Figure 6:
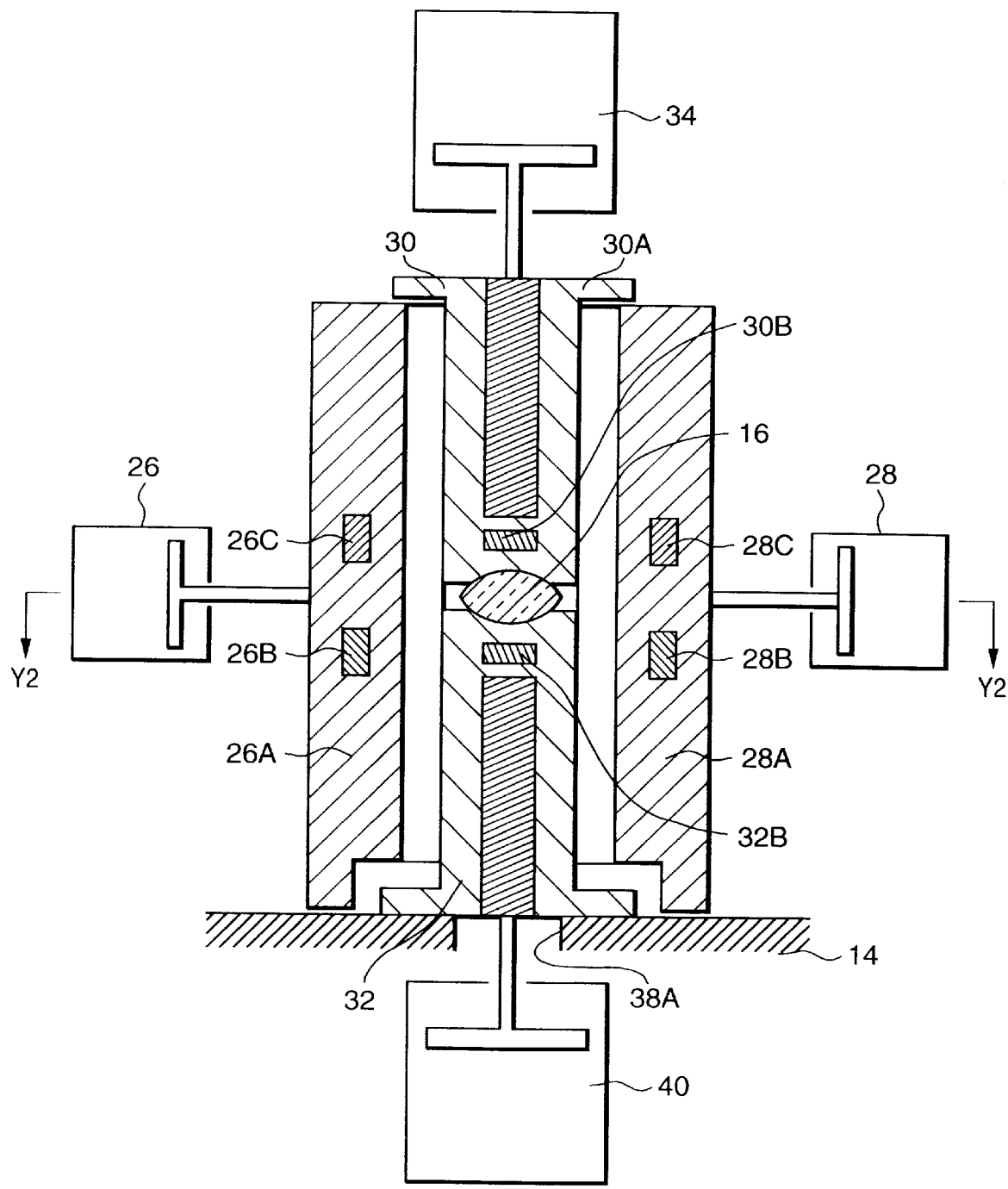
FIG. 6 is a sectional view taken along a line Y1—Y1 in FIG. 5 showing the main part of a molding apparatus of the second embodiment according to the present invention, which shows molds and their vicinity when the press operation is almost complete.
Figure 7:
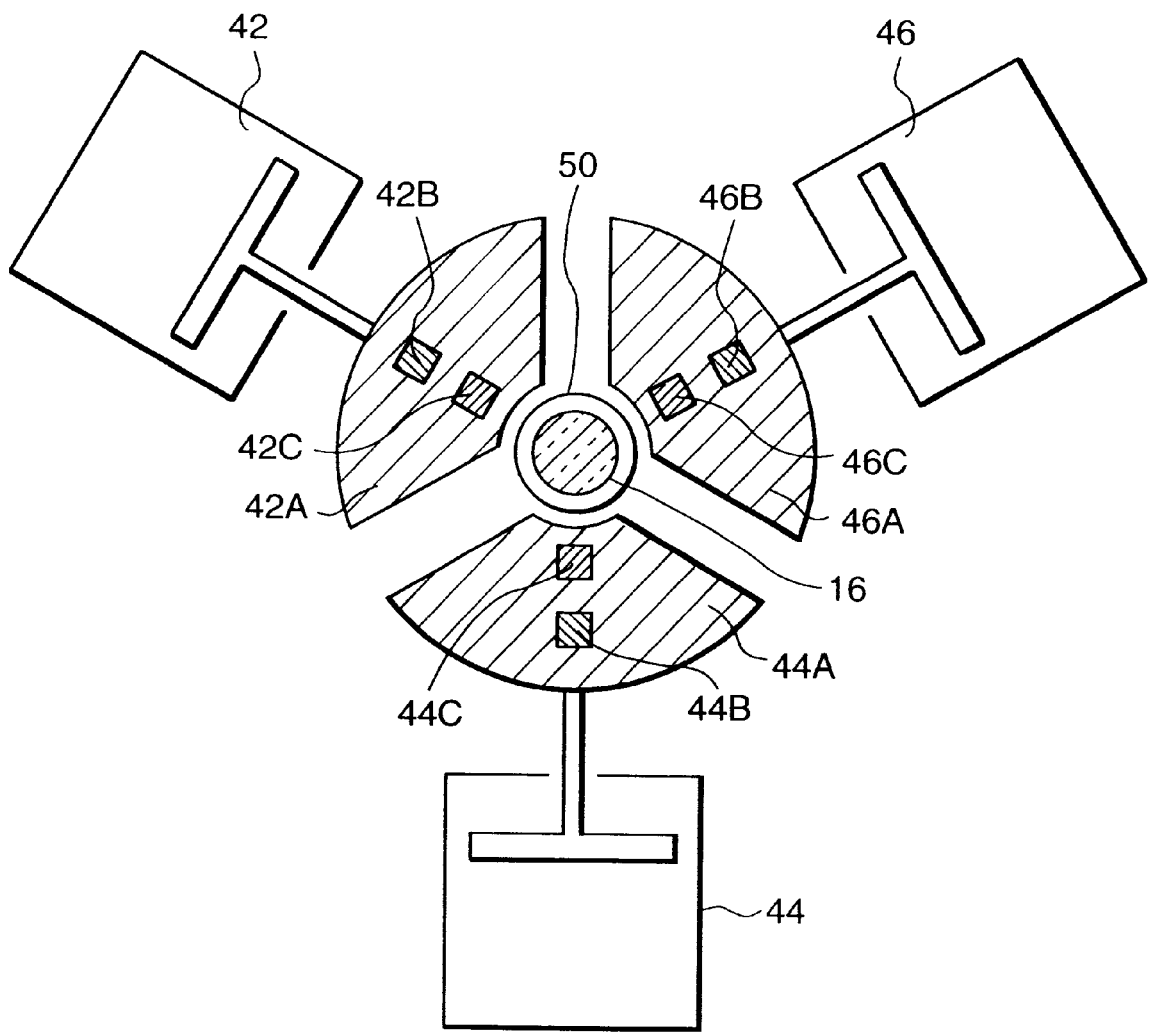
FIG. 7 is a sectional view taken along a line Z2—Z2 in FIG. 9 showing the main part of a molding apparatus of the third embodiment according to the present invention, which shows the state before and during pressing.

As shown in FIGS. 4 to 6, an upper mold 30 and a lower mold 32 are fitted to be vertically slidable in a space formed between two circumferential surface press members 26A and 28A. A disk-like flange 30A is formed on the upper end portion of the upper mold 30. The lower surface of this flange 30A abuts against the upper surfaces of the circumferential surface press members 26A and 28A from above to regulate the downward movement of the upper mold 30, thereby defining the downward press stroke of the upper mold 30.

An upper mold driving mechanism 34 for generating a pressure to a glass material is provided above the upper mold 30. The distal end portion of a rod extending from the upper mold driving mechanism 34 is connected to the upper surface of the upper mold 30 via a connecting member (e.g., a floating joint (no shown)) capable of transmitting the pressure while permitting slight off-axis play. When the upper mold driving mechanism 34 is made to perform a downward extending operation, the upper mold 30 is pressed down to apply the pressure to the glass material. When the upper mold driving mechanism 34 is made to perform an upward retracting operation, the upper mold 30 is pulled up.

An upper mold heater 30B is arranged inside the upper mold 1 to directly heat the upper mold 30.

The lower surface of the lower mold 32 is placed on the upper surface of a support base plate 38 for defining a reference surface. This support base plate 38 receives the downward pressure applied from the upper mold 38 to the lower mold 32 via the glass material.

A lower mold driving mechanism 40 is arranged below the lower surface of the lower mold 32 and connected to the lower surface of the lower mold 32 via a through hole 38A formed in the support base plate 38. Similar to the upper mold 30, the lower mold 32 and the lower mold driving mechanism 40 are connected via a connecting member (e.g., a floating joint (not shown)) capable of transmitting the pressure while permitting slight off-axis play. In a cooling process, the lower mold driving mechanism 40 is made to perform an upward extending operation to press the lower mold 32 upward, thereby applying the pressure to a press-deformed molded product 16.

A lower mold heater 32B is arranged inside the lower mold 32 to directly heat the lower mold 32.

As in the first embodiment, the circumferential surface press members 26A and 28A are so arranged as to clamp the outer circumferential portions of the upper and lower molds 30 and 32 and connected to circumferential surface press member driving mechanisms 26 and 28, respectively. Mechanisms (e.g., electric servo motors) capable of high-accuracy positioning are used as the circumferential surface press member driving mechanisms 26 and 28. The circumferential surface press member driving mechanisms 26 and 28 are precisely controlled in terms of the distance to the upper and lower molds 30 and 32 and also controlled in terms of the pressing force.

When a glass material is supplied into the molds or a molded product is extracted from the molds, the circumferential surface press member driving mechanisms 26 and 28 perform a retracting operation to increase the distance between the circumferential surface press members 26A and 28A. This allows the insertion of, e.g., an automatic hand.

The lower surfaces of the circumferential surface press members 26A and 28A are in slidable contact with the support base plate 38. Also, the circumferential surface press members 26A and 28A incorporate heaters 26B and 28B and contact surface temperature sensors 26C and 28C for measuring the temperatures near the mold contact surfaces, respectively. Consequently, the circumferential surface press members 26A and 28A can be adjusted to an arbitrary temperature.

As in the first embodiment, a controller 100 totally controls the operations of the individual mechanisms and heaters of the optical device molding apparatus of the second embodiment.

[Lens Molding Procedure]

A procedure of obtaining a glass molded product such as a lens by using the above optical device molding apparatus will be described below.

With reference to FIGS. 4 to 6, the upper mold driving mechanism 34 is made to perform a retracting operation to slide the upper mold 30 upward, thereby retracting the upper mold 30 from the lower mold 32. Also, the circumferential surface press member driving mechanisms 26 and 28 are made to perform a retracting operation to retract the circumferential surface press members 26A and 28A from the outer circumferences of the molds. In this state, a glass material heated to a predetermined temperature is supplied onto the transfer molding surface of the lower mold 32 by, e.g., an automatic hand. Thereafter, the circumferential surface press members 26A and 28A are pressed and moved to positions slightly apart from positions where these members abut against the upper and lower molds 30 and 32, so that the upper and lower molds 30 and 32 can move vertically (see FIG. 4). Note that in this state the gap between the circumferential surface press members 26A and 28A and the upper and lower molds 30 and 32 can be a comparatively rough one and is determined by taking account of the slidability of the upper and lower molds 30 and 32. Note also that the upper and lower molds 30 and 32 are heated to a temperature meeting predetermined molding conditions and the circumferential surface press members 20A and 22A are also adjusted to a predetermined temperature.

Thereafter, the upper mold driving mechanism 34 is made to perform an extending operation to press the transfer molding surface of the upper mold 30 against the upper surface of the glass material, thereby applying a pressure to the glass material. When the upper mold 30 gradually moves down, the glass material is gradually pressed in the horizontal direction. Finally, the glass material is completely deformed when the flange 30A of the upper mold 30 abuts against the upper surfaces of the circumferential surface press members 26A and 28A.

After the pressing force applied to the upper mold 30 by the upper mold driving mechanism 34 is released to be substantially zero, the circumferential surface press member driving mechanisms 26 and 28 are made to perform an extending operation to press the circumferential surface press members 26A and 28A against the outer circumferential surfaces of the upper and lower molds 30 and 32. The upper and lower molds 30 and 32 are kept pressed for a while and started to be cooled. By this pressing (the state shown in FIGS. 5 and 6), it is possible to correct a positional shift between the central axes of the upper and lower molds 30 and 32 and thereby align the optical axes of the optical function surfaces of the upper and lower molds 30 and 32.

After the cooling of the upper and lower molds 30 and 32 and the circumferential surface press members 26A and 28A is started and held for a few seconds, the circumferential surface press member driving mechanisms 26 and 28 are made to perform a slight retracting operation to form a minimum gap permitting vertical sliding between the circumferential surface press members and the upper and lower molds 30 and 32.

Note that the position of this gap is controlled with high accuracy. In this state, the upper mold driving mechanism 34 is again made to perform an extending operation to press the upper mold 30. The lower mold driving mechanism 40 is made to perform an extending operation to press the lower mold 32 upward to apply the pressure to the molded product so as to retain the surface shapes of the molded product.

When the temperature lowers to a predetermined temperature, the lower mold driving mechanism 40 is made to perform a retracting operation to release the pressure.

Thereafter, the upper mold driving mechanism 34 is again made to perform a retracting operation to move the upper mold 30 upward. Simultaneously, the circumferential surface press member driving mechanisms 26 and 28 are made to perform a retracting operation to retract the circumferential surface press members away from the molds. The resultant molded product is extracted to the outside by, e.g., an automatic hand.

In the series of operations described above, it is possible not only to decrease the cost but also to effectively use the space around the upper and lower molds because the circumferential surface press members also function as a mold frame for the upper and lower molds. Consequently, effective means for correcting an optical axis shift can be arranged. That is, a portion where the upper and lower molds vertically slide along a mold frame when the mold frame is additionally used can also be used as the contact surface between the circumferential surface press members and the molds. Consequently, it is possible to increase the fitting length between the circumferential surface press members and the molds and form a molded product with higher decentering accuracy.

[Third Embodiment]

The third embodiment differs from the optical device molding apparatus of the second embodiment in that circumferential surface press members also function as molds for forming portions of a circumferential surface of a molded product and are arranged in three directions around the outer circumferential portions of molds. The rest of the arrangement is substantially the same as the first and second embodiments, so a detailed description of the same parts will be omitted.

Figure 8:
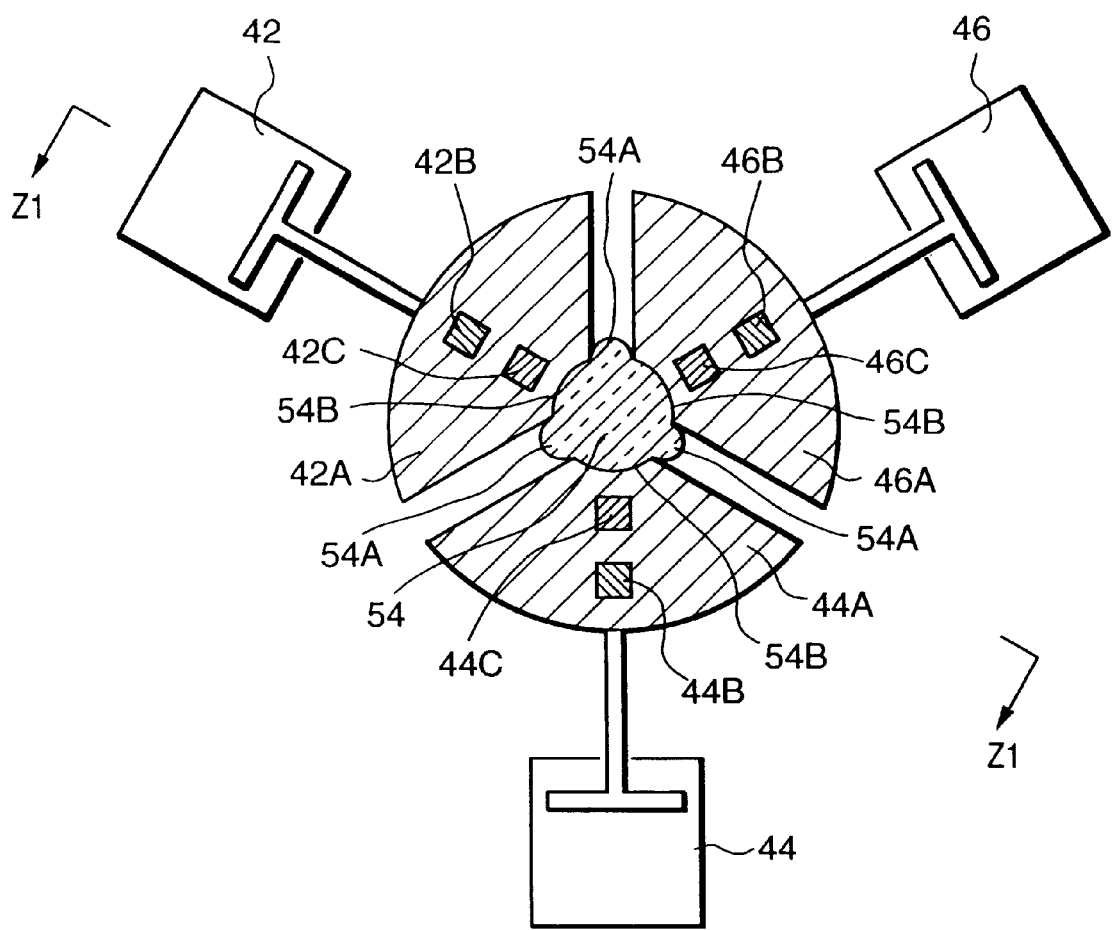
FIG. 8 is a sectional view taken along the line Z2—Z2 in FIG. 9 showing the main part of the molding apparatus of the third embodiment according to the present invention, which shows the state when the press operation is almost complete.
Figure 9:
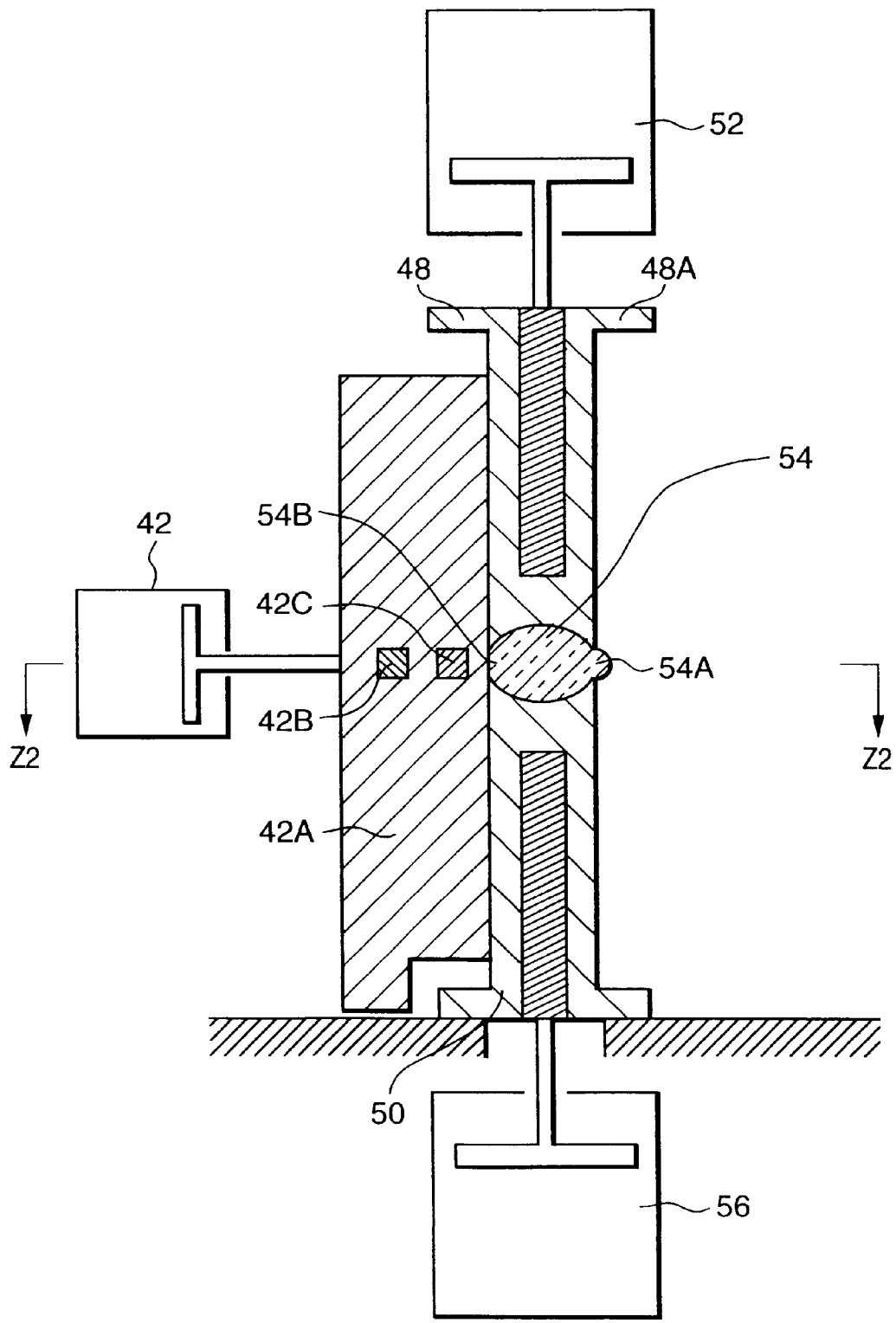
FIG. 9 is a sectional view taken along a line Z1—Z1 in FIG. 8 showing the main part of the molding apparatus of the third embodiment according to the present invention, which shows molds and their vicinity when the press operation is almost complete.
Figure 10:
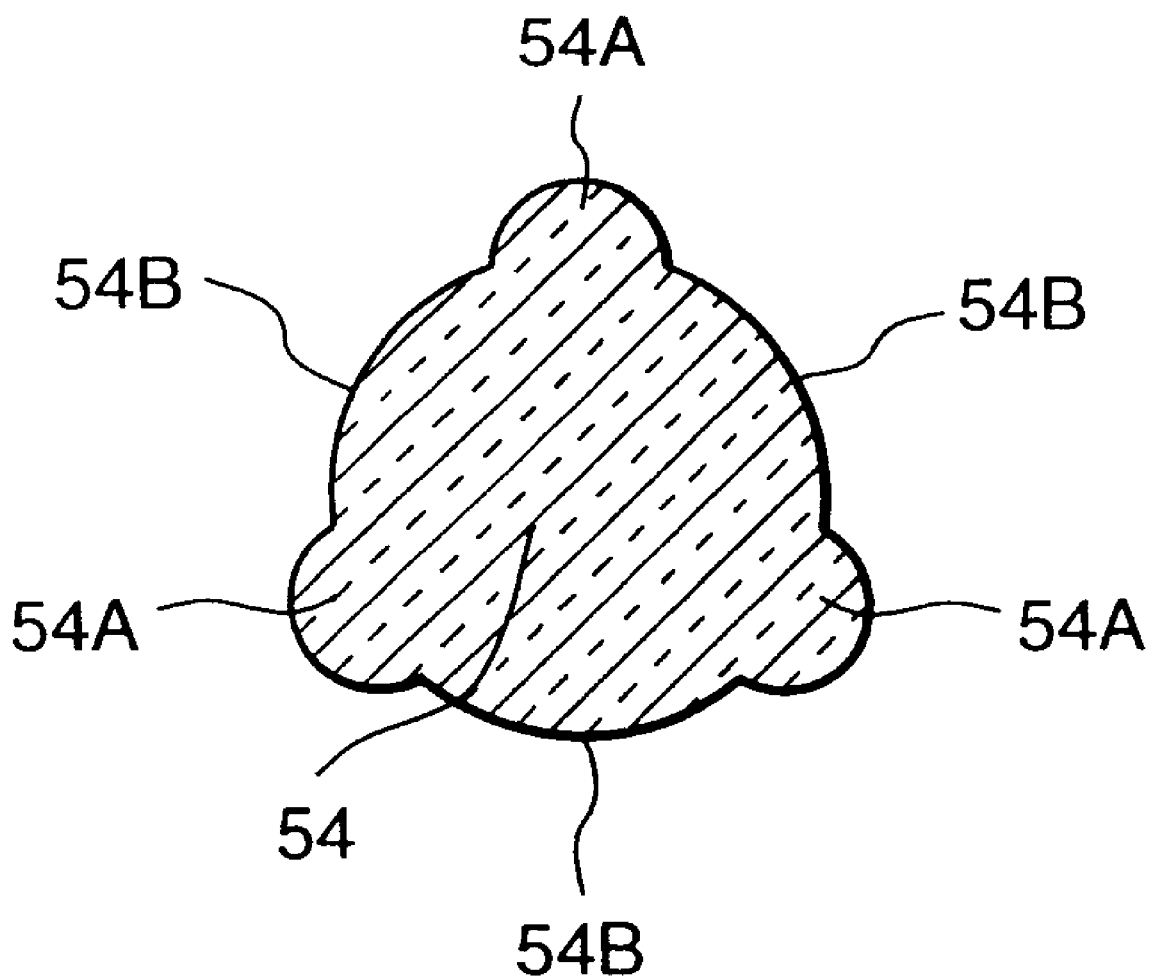
FIG. 10 is a view showing a molded product obtained by the optical device molding apparatus of the third embodiment according to the present invention.

As shown in FIGS. 7 to 10, an upper mold 48 and a lower mold 50 are fitted to be vertically slidable in a space surrounded by three circumferential surface press members 42A, 44A, and 46A. To correct a shift between the optical axes of the upper and lower molds 48 and 50 and form portions of the circumferential surface of a molded product, portions of the circumferential surface press members 42A, 44A, and 46A in contact with the upper and lower molds 48 and 50 are formed into arcuate shapes matching portions of the outer circumferences of the upper and lower molds 48 and 50. These circumferential surface press members 42A, 44A, and 46A are brought into contact with the outer circumferential portions of the upper and lower molds 48 and 50 with no gap between them. Note that in the third embodiment, as shown in FIGS. 8 and 9, the entire outer circumferences of the upper and lower molds 48 and 50 are not closed; i.e., the three circumferential surface press members 42A, 44A, and 46A are arranged with predetermined spacings between them so that a glass material partially extends from the molds. However, depending upon the processing accuracy of the molds, the circumferential surface press members may have a shape abutting against the entire outer circumferences.

Circumferential surface press member driving mechanisms 42, 44, and 46 are provided on the sides of the circumferential surface press members 42A, 44A, and 46A away from the sides on which these members abut against the molds. These circumferential surface press member driving mechanisms 42, 44, and 46 are arranged radically from the outer circumferential portions of the upper and lower molds 48 and 50 and equally spaced in three directions.

When a glass material is supplied into the molds or a molded product is extracted from the molds, the circumferential surface press member driving mechanisms 42, 44, and 46 perform a retracting operation to increase the distance between the circumferential surface press members 42A, 44A, and 46A. This allows the insertion of, e.g., an automatic hand.

The circumferential surface press members 42A, 44A, and 46A incorporate heaters 42B, 44B, and 46B and contact surface temperature sensors 42C, 44C, and 46C for measuring the temperatures near the mold contact surfaces, respectively. Consequently, the circumferential surface press members 42A, 44A, and 46A can be adjusted to an arbitrary temperature.

As in the first and second embodiments, a controller 100 totally controls the operations of the individual mechanisms and heaters of the optical device molding apparatus of the third embodiment.

[Lens Molding Procedure]

A procedure of obtaining a glass molded product such as a lens by using the above optical device molding apparatus will be described below.

With reference to FIGS. 7 to 10, as in the second embodiment described above, a glass material heated to a predetermined temperature is supplied onto the transfer molding surface of the lower mold 50 by, e.g., an automatic hand. Thereafter, the circumferential surface press member driving mechanisms 42, 44, and 46 are made to perform an extending operation to move the circumferential surface press members 42A, 44A, and 46A to positions slightly apart from positions where these members abut against the upper and lower molds 48 and 50, thereby forming a minimum gap which allows the upper and lower molds 48 and 50 to slide (see FIG. 7). Note that the position of this gap is controlled with high accuracy. Note also that the upper and lower molds 48 and 50 and the circumferential surface press members 42A, 44A, 46A are heated to a temperature meeting predetermined molding conditions.

Thereafter, the upper mold driving mechanism 52 is made to perform an extending operation to press the transfer molding surface of the upper mold 48 against the upper surface of the glass material, thereby pressing the glass material. When the upper mold 48 gradually moves down, the glass material is gradually pressed in the horizontal direction. Finally, the glass material is completely deformed when a flange 48A of the upper mold 48 abuts against the upper surfaces of the circumferential surface press members 42A, 44A, and 46A. In this state, the glass material extending from the circumferential surfaces of the upper and lower molds 48 and 50 come in contact with the circumferential surface press members 42A, 44A, and 46A to form circumferential surface regulating portions 54B of the molded product and also form circumferential surface extending portions 54A extending from the molds.

After the pressing force applied to the upper mold 48 by the upper mold driving mechanism 52 is released to be substantially zero, the circumferential surface press member driving mechanisms 42, 44, and 46 are made to perform an extending operation to press the circumferential surface press members 42A, 44A, and 46A against the outer circumferential portions of the upper and lower molds 48 and 50. The upper and lower molds 48 and 50 are kept pressed for a while and started to be cooled (see FIGS. 8 and 9).

After the cooling of the upper and lower molds 48 and 50 and the circumferential surface press members 42A, 44A, and 46A is started and held for a few seconds, the circumferential surface press member driving mechanisms 42, 44, and 46 are made to perform a slight retracting operation to again form a minimum gap permitting sliding between the circumferential surface press members 42A, 44A, and 46A and the upper and lower molds 48 and 50. In this state, the upper mold driving mechanism 52 is again made to perform an extending operation to apply a pressure to the upper mold 48. To retain the surface shapes of a molded product 54 and finish the circumferential surface regulating portions 54B of the molded product, the lower mold driving mechanism 56 is made to perform an extending operation to press the lower mold 50 upward to apply the pressure to the molded product 54. When the temperature of the upper and lower molds 48 and 50 and the circumferential surface press members 42A, 44A, and 46A lowers to a predetermined temperature, the lower mold driving mechanism 56 is made to perform a retracting operation to release the pressure.

Thereafter, the upper mold driving mechanism 52 is again made to perform a retracting operation to move the upper mold 48 upward. Simultaneously, the circumferential surface press member driving mechanisms 42, 44, and 46 are made to perform a retracting operation to retract the circumferential surface press members 42A, 44A, and 46A away from the molds. The resultant molded product is extracted from the molds by, e.g., an automatic hand.

In the series of operations described above, it is possible to correct a shift between the central axes of the molds and also mold the circumferential surface of a molded product because the circumferential surface press members also function as a part of the molds. Consequently, the molded product has a circumferential surface with very high positional accuracy with respect to the optical axes of the optical function surfaces. Also, a portion of the circumferential surface of the molded product is defined in three directions. Accordingly, the roundness of the circumferential surface shape of the molded product can be increased compared to a case in which the circumferential surface is defined in two directions. Consequently, when a lens requiring strict decentering accuracy is incorporated into a lens barrel, the circumferential surface of the lens can be well used as a reference surface.

Note that when the upper mold 48 ascends, the molded product 54 sometimes sticks in a slightly offset state to the upper mold 48 due to a delicate optical contact balance of the transfer molding surfaces of the upper and lower molds 48 and 50. If this is the case, the circumferential surface press member driving mechanisms 42, 44, and 46 are operated to abut the circumferential surface press members 42A, 44A, and 46A against the upper and lower molds 48 and 50 several times. Consequently, the circumferential surface press members 42A, 44A, and 46A come in contact with a portion of the molded product 54, and the molded product 54 falls onto the transfer molding surface of the lower mold 50.

In this case, the molded product 54 can sometimes fall to deviate from the center of the lower mold 50 and make extraction by an automatic hand impossible. Therefore, the press members 42A, 44A, and 46A are again abutted against the upper and lower molds 48 and 50 several times to push the molded product 54 back to the normal position in the lower mold 50. This makes extraction by an automatic hand feasible.

Although the above molded product extracting operations can be performed each time a molded product is extracted, the operations can also be performed only when adhesion of a molded product to the upper mold or a positional deviation of the molded product is sensed by, e.g., a sensor.

As described above, an optical axis shift between the molds can be corrected by the circumferential surface press members to form portions of the circumferential surface of a molded product. Also, a positional deviation when a molded product is extracted can be corrected. Therefore, a very simple apparatus can be obtained.

In the embodiments of the present invention as described above, when the glass deformation done by the press operation by the upper and lower molds is complete or nearly complete, the outer circumferences of the upper and lower molds are simultaneously pressed toward the center of the molds independently of the press operation by the upper and lower molds. This allows molding of an optical device requiring strict optical axis accuracy regardless of the axial accuracy of the mold holding portion or the press shaft. That is, no expensive molding machine is necessary, and an optical device with reliable axial accuracy can be obtained. This makes the apparatus superior in both cost and accuracy.

Also, the circumferential surface press members for simultaneously pressing the outer circumferences of the upper and lower molds toward to the center of the molds also function as guide members for guiding the upper and lower molds to be vertically slidable. This not only obviates the need for a mold frame to simplify the construction but also allows the space around the molds to be effectively used. Accordingly, the contact portion between the circumferential surface press members and the upper and lower molds can be extended along the axial direction of the molds. Consequently, an optical device with higher optical axis accuracy can be obtained.

Additionally, the circumferential surface press members constitute a portion of molds for forming at least a portion of the circumferential surface of an optical device. Accordingly, the circumferential surface can be formed simultaneously with molding by the upper and lower molds. This simplifies the mold construction and eliminates the need to process the circumferential surface of an optical device in the subsequent step. Furthermore, it is possible to obtain an optical device with high accuracy in terms of the optical axes of the upper and lower molds and the positional relationship between the optical axes and the circumferential surface. This allows high-accuracy assembly using the circumferential surface of an optical device in the subsequent step.

The circumferential surface press members have a function as auxiliary means for moving an optical device, remaining in an offset position in the molds after molding, toward the center of the molds. Accordingly, it is possible to push back a molded product sticking in an offset state to the upper mold after mold opening and drop the molded product onto the normal position in the lower mold or to push a molded product offset from the center of the lower mold during mold opening back toward the center of the mold. Consequently, it is possible not only to obtain an optical device with high optical axis accuracy but also to prevent extraction errors by an automatic hand with a simple construction. This allows smooth extraction of molded products and increases the operating efficiency of the apparatus.

Furthermore, at least three circumferential surface press members are provided at equal intervals with respect to the central axis of the molds. Therefore, optical devices having various circumferential surface shapes can be molded. Also, since the circumferential surface shape accuracy of an optical device can be increased, it is possible to obtain an optical device having a circumferential surface shape with high positional accuracy with respect to the optical axis.

In the third embodiment, three circumferential surface press members are used to form portions of the circumferential surface of a lens. However, four circumferential surface press members can be used in forming a rectangular lens. That is, the number of the circumferential surface press members can be changed in accordance with the shape of an optical device.

Moreover, although a one-cavity mold is used in each of the above embodiments, a four-cavity mold can also be used. That is, the number of mold cavities can be freely changed.

The glass lenses manufactured in the first embodiment were assembled into cameras and compact cameras and subjected to technical evaluations. As a consequence, it was found that the parallel decentering and the optical axis inclination of the lenses manufactured by the method of the first embodiment were 2 $\mu$m and 10 sec, respectively, and yet the projection resolving power of the lenses was 100 lines/mm or more in both central and peripheral portions. This demonstrates that the glass product molding method of this embodiment can mold excellent glass products.

As many apparently widely different embodiments of the present invention can be made without departing from the spirit and scope thereof, it is to be understood that the invention is not limited to the specific embodiments thereof except as defined in the appended claims.

What is claimed is:

1. A method of molding an optical device having a plurality of optical surfaces, comprising the steps of:

inserting a material of said optical device into a pair of first and second molds, said molds having transfer surfaces for transferring the optical surfaces of said optical device;

holding said pair of molds and the material of said optical device at a temperature at which press deformation is possible, and pressing the material of said optical device by said pair of molds to transfer the optical surfaces to the material; and pushing outer circumferential portions of said first and second molds simultaneously in a direction perpendicular to optical axes of the optical surfaces of said first and second molds to adjust a relative location of the optical axis of the optical surface of the first mold to the optical axis of the optical surface of the second mold.

2. The method according to claim 1, wherein the optical axes of the optical surfaces are adjusted, when the press deformation of the material of said optical device is complete or while the material is being cooled, by adjusting means for moving said pair of molds in the direction perpendicular to the optical axes of the optical surfaces.

3. The method according to claim 2, wherein a plurality of said adjusting means are provided around the optical axes of the optical surfaces, and the optical axes of the optical surfaces are adjusted by clamping and pushing said pair of molds by said plurality of adjusting means.

4. The method according to claim 3, wherein after the optical surfaces are transferred to the material of said optical device, the optical axes of the optical surfaces is adjusted before and while the material is cooled and said molds are moved in accordance with contraction of the material.

5. The method according to claim 4, wherein the optical surfaces are transferred by setting the material of said optical device to have a first viscosity of $10^{6.5}$ to $10^{10}$ dyn·s/cm$^2$, the material of said optical device onto which the optical surfaces are transferred is set to have a second viscosity of $10^{8.5}$ to $10^{12.5}$ dyn·s/cm$^2$, and the optical axes of the optical surfaces is adjusted within a range of the second viscosity.

6. The method according to claim 5, wherein a shift between the optical axes of the optical surfaces and an inclination of the optical axes are regulated by adjusting the optical axes of the optical surfaces.

* * * * *